Dec. 30, 1941.  F. W. WOOD  2,267,883
BIRD FEEDER
Filed May 28, 1940
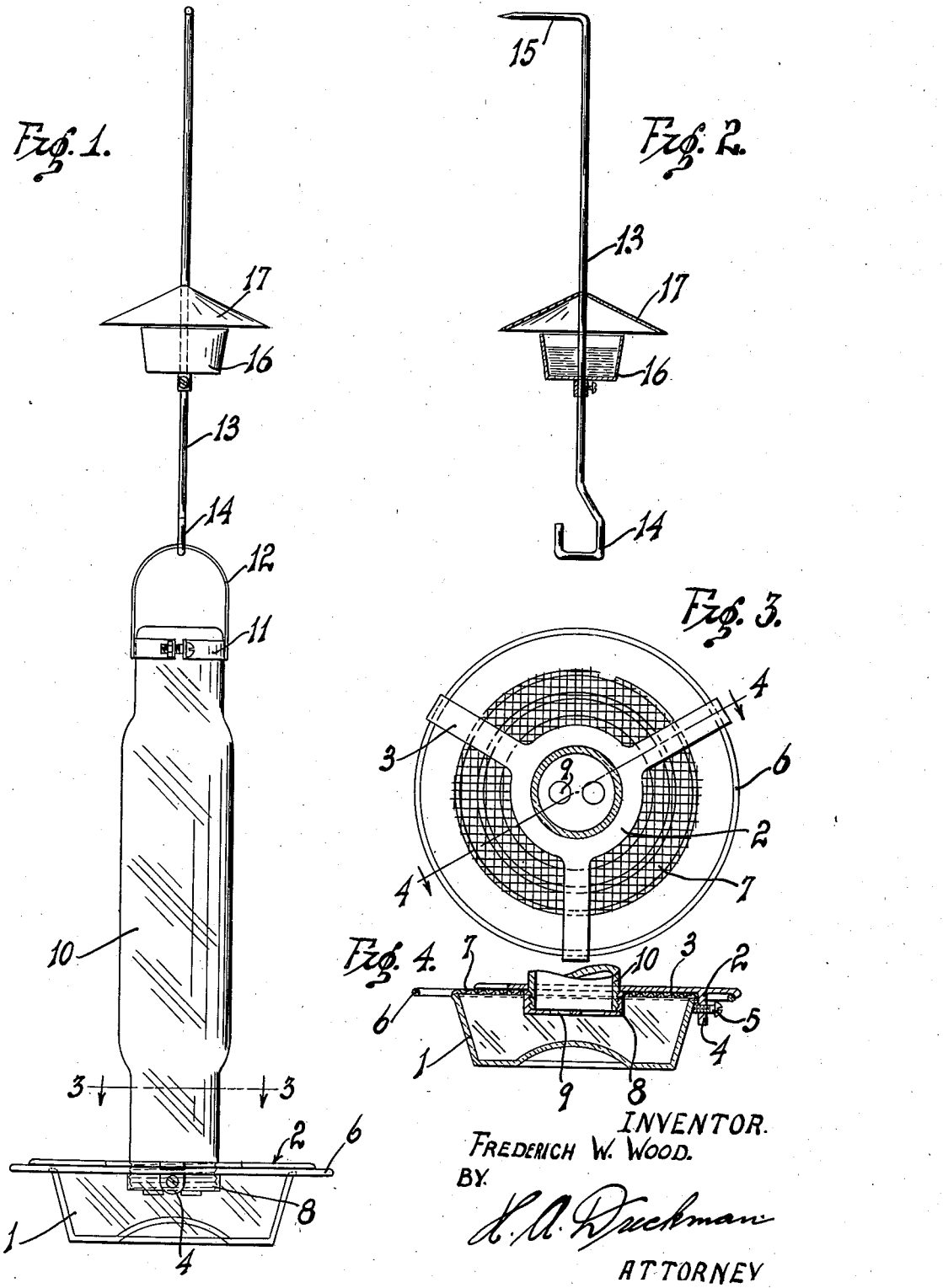
INVENTOR.
FREDERICK W. WOOD.
BY
ATTORNEY Patented Dec. 30, 1941

2,267,883

UNITED STATES PATENT OFFICE 2,267,883

BIRD FEEDER

Frederich W. Wood, Long Beach, Calif.

Application May 28, 1940, Serial No. 337,601

4 Claims. (Cl. 119—77)

This invention relates to a bird feeder, and particularly a feeder for humming birds, whereby a quantity of sweet liquid can be retained in a cup which is available to the birds.

An object of my invention is to provide a novel bird feeder, which is pleasing in appearance, and which will effectively prevent bees and ants from eating the sweet liquid retained in the bottom cup.

Another object of my invention is to provide a novel bird feeder, which can be easily refilled and cleaned from time to time.

A feature of my invention is to provide a novel bird feeder, which can be readily supported in a place frequented by the birds, and which can be easily moved from place to place, as desired.

Other objects, advantages and features of invention may appear from the accompanying drawing, the subjoined detailed description, and the appended claims.

In the drawing:

Figure 1 is a side elevation of my novel bird feeder.

Figure 2 is a transverse, sectional view of the supporting link and ant trap.

Figure 3 is a sectional view taken on line 3—3 of Figure 1.

Figure 4 is a sectional view taken on line 4—4 of Figure 3.

Referring more particularly to the drawing, the numeral 1 indicates a bottom cup, preferably made of glass, and which is adapted to contain a quantity of sweet liquid, as will be further described. A frame 2 is detachably secured to the cup 1, and this frame comprises a plurality of radial arms 3 on each of which a depending lug 4 is provided. A set screw 5 extends through each of the lugs 4, and bears against the side of the cup 1, thus holding the frame 2 securely in position. A ring 6 is attached to the outer end of each of the arms 3, and provides a perch for the birds. A wire screen 7 rests on top of the cup 1, and is held in position by the frame 2. This wire screen prevents bees and the like from feeding off of the sweet liquid in the cup 1. A centrally threaded sleeve 8 is provided on the frame 2, and this sleeve is provided with a pair of outlet holes 9, through which the sweet liquid is fed into the cup 1. A glass jar 10 is closed at the top and open at the bottom. This jar screws into the sleeve 8, substantially as shown in Figure 1, and contains the sweet liquid. The liquid flows into the cup 1 from the jar 10, as the liquid is consumed by the birds out of the bottom cup.

A ring 11 is clamped on the upper end of the jar 10, and this ring is provided with a bail 12. A wire supporting link 13 is provided with a hook 14 at the lower end, which engages the bail 12 for the purpose of supporting the feeder. The upper end of the link 13 may be provided with a loop or a sharp prong 15, as shown in Figure 2, which can be driven into a tree, the side of a building, or the like, for the purpose of properly supporting the feeder. A tray 16 is mounted on the link 13 and surrounds this link for the purpose of preventing the ants from traveling down this link and thence along the feeder to the bottom cup 1. A hood 17 is fixedly mounted on the link 13 above the tray 16 to prevent an excessive accumulation of liquid in the tray 16—for example, to prevent rain or water from sprinkling to enter this tray. The tray 16 is partially filled with an oil, and thus effectively acts as an ant barrier to prevent these ants from moving downwardly to the bottom cup 1 containing the sweet liquid. The cup 1 will be constantly fed with sweet liquid from the jar 10, and the level of this liquid will remain substantially constant in the cup.

The birds will rest on the perch 6 and will feed through the screen 7, since the level of the liquid is only a short distance below this screen. Bees and other insects will be excluded due to this screen, and, as previously stated, the ant-barrier 16 will prevent ants from feeding.

Having described my invention, I claim:

1. A bird feeder comprising a bottom feeding cup, a frame detachably secured to the cup, a perch mounted on the frame, a threaded sleeve on the frame, a jar threaded into the sleeve, said sleeve having openings therein through which liquid passes into the cup, a bail mounted at the upper end of the jar, and a supporting link engaging the bail.

2. A bird feeder comprising a bottom feeding cup, a frame detachably secured to the cup, a perch mounted on the frame, a threaded sleeve on the frame, a jar threaded into the sleeve, said sleeve having openings therein through which liquid passes into the cup, a bail mounted at the upper end of the jar, a supporting link engaging the bail, an ant barrier on the link, including a tray encircling the link, and a wire screen extending over the cup.

3. A bird feeder comprising a glass feeding cup, a frame including a plurality of arms, a set screw extending through each of the arms and bearing against the side of the cup whereby the frame is detachably secured to the cup, a central threaded sleeve on the frame, a glass jar threaded into the sleeve, said sleeve having holes therein through which liquid passes into the cup from the jar, a wire screen extending over the cup and arranged between the cup and the frame, a perch on the frame, said perch being spaced from the cup and encircling the same, a ring clamped to the upper end of the jar, and a bail on the ring whereby the feeder is supported.

4. A bird feeder comprising a glass feeding cup, a frame including a plurality of arms, a set screw extending through each of the arms and bearing against the side of the cup whereby the frame is detachably secured to the cup, a central threaded sleeve on the frame, a glass jar threaded into the sleeve, said sleeve having holes therein through which liquid passes into the cup from the jar, a wire screen extending over the cup and arranged between the cup and the frame, a perch on the frame, said perch being spaced from the cup and encircling the same, a ring clamped to the upper end of the jar, a bail on the ring whereby the feeder is supported, a supporting link engaging the bail, and an ant barrier on the link.

FREDERICH W. WOOD.